United States Patent
Reinhardt et al.

(10) Patent No.: US 9,205,606 B2
(45) Date of Patent: Dec. 8, 2015

(54) METHOD FOR REINFORCING A FIBER COMPOSITE COMPONENT AND ARRANGEMENT FOR PRODUCING A REINFORCED FIBER COMPOSITE COMPONENT

(75) Inventors: Milan Reinhardt, Ratzeburg (DE); Tobias Dorowa, Hamburg (DE); Philipp Baisch, Stade (DE); Torben Jacob, Beckdorf (DE); Carsten Barlag, Jever (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 13/496,692

(22) PCT Filed: Sep. 7, 2010

(86) PCT No.: PCT/EP2010/063122
§ 371 (c)(1),
(2), (4) Date: May 23, 2012

(87) PCT Pub. No.: WO2011/032865
PCT Pub. Date: Mar. 24, 2011

(65) Prior Publication Data
US 2012/0222800 A1 Sep. 6, 2012

Related U.S. Application Data

(60) Provisional application No. 61/243,682, filed on Sep. 18, 2009.

(30) Foreign Application Priority Data

Sep. 18, 2009 (DE) .......................... 10 2009 029 575

(51) Int. Cl.
*B32B 37/10* (2006.01)
*B21D 53/88* (2006.01)
(Continued)

(52) U.S. Cl.
CPC ............. *B29C 70/543* (2013.01); *B29C 31/008* (2013.01); *B29C 33/76* (2013.01); *B29D 99/001* (2013.01)

(58) Field of Classification Search
CPC .. B29D 99/014; B29D 99/001; B29C 31/008; B29C 70/543; B29C 33/76
USPC .......................... 156/182, 581, 560, 562, 494
See application file for complete search history.

(56) References Cited

U.S. PATENT DOCUMENTS 4,836,765 A * 6/1989 Kornitzky et al. ............ 425/388
(Continued)

FOREIGN PATENT DOCUMENTS

CN 101484290 7/2009
(Continued)

OTHER PUBLICATIONS

Office Action from the German Patent Office in the corresponding priority application 10 2009 029 575.5.
(Continued)

*Primary Examiner* — Michael N Orlando
*Assistant Examiner* — Marta Dulko
(74) *Attorney, Agent, or Firm* — Greer, Burns & Crain Ltd.

(57) ABSTRACT

An arrangement for reinforcing a fiber composite component for the aviation and aerospace industry, in which a reinforcing element having a receiving region and a pressure element adapted to the receiving region geometry are provided. The pressure element is inserted into the reinforcing element receiving region. The reinforcing element and the inserted pressure element are fastened relative to one another in a reproducible manner by a reversible fastening device. The fastening device includes a first fastening portion mounted on the pressure element and a second fastening portion which can be mounted on the reinforcing element. The reinforcing element, together with the pressure element fastened thereto, is then applied in a reproducible manner to the fiber composite component cured to connect the reinforcing element to the fiber composite component. The reversible fastening device and the pressure element are then removed from the reinforced fiber composite component.

1 Claim, 7 Drawing Sheets

(51) Int. Cl.
*B29C 70/54* (2006.01)
*B29C 31/00* (2006.01)
*B29C 33/76* (2006.01)
*B29D 99/00* (2010.01)

(56) References Cited

U.S. PATENT DOCUMENTS

| | | | | |
|---|---|---|---|---|
| 5,707,576 | A * | 1/1998 | Asher | 264/258 |
| 7,479,201 | B1 * | 1/2009 | Wegner et al. | 156/242 |
| 7,871,487 | B1 * | 1/2011 | Wegner et al. | 156/242 |
| 8,236,124 | B1 * | 8/2012 | Wegner et al. | 156/242 |
| 8,268,226 | B2 * | 9/2012 | Vander Wel et al. | 264/486 |
| 8,746,315 | B2 * | 6/2014 | Barlag et al. | 156/560 |
| 8,778,117 | B2 * | 7/2014 | Dorawa et al. | 156/245 |
| 2007/0175171 | A1 * | 8/2007 | Delgado et al. | 52/741.1 |
| 2009/0320292 | A1 * | 12/2009 | Brennan et al. | 29/897.2 |
| 2010/0007044 | A1 * | 1/2010 | Jacob et al. | 264/219 |
| 2010/0007056 | A1 * | 1/2010 | Jacob et al. | 264/320 |
| 2010/0314042 | A1 * | 12/2010 | Luebbering et al. | 156/286 |
| 2011/0056624 | A1 * | 3/2011 | Gensewich et al. | 156/285 |
| 2012/0097323 | A1 * | 4/2012 | Nitsch | 156/212 |

FOREIGN PATENT DOCUMENTS

| | | |
|---|---|---|
| DE | 69109642 | 9/1995 |
| DE | 10 2007 061 431 | 6/2009 |
| DE | 102007061431 | 6/2009 |
| DE | 10 2008 032 834 | 1/2010 |
| EP | 2 159 039 | 3/2010 |
| RU | 2005652 | 1/1994 |
| SU | 1777297 | 5/1997 |
| WO | WO 2008/003721 | 1/2008 |
| WO | WO 2010/125001 | 11/2010 |

OTHER PUBLICATIONS

Russian Decision on Grant, Sep. 7, 2010.
Office Action from the German Patent Office in the corresponding priority application 10 2009 029 575.5, Apr. 16, 2010.

* cited by examiner

METHOD FOR REINFORCING A FIBER COMPOSITE COMPONENT AND ARRANGEMENT FOR PRODUCING A REINFORCED FIBER COMPOSITE COMPONENT

CROSS-REFERENCE TO RELATED APPLICATION

This application claims the benefit of U.S. provisional application No. 61/243,682, filed Sep. 18, 2009, and German patent Application No 10 2009 029 575.5, filed Sep. 18, 2009 the entire disclosures of which are herein incorporated by reference.

FIELD OF THE INVENTION

The present invention relates to a method for reinforcing a fibre composite component, in particular for the aviation and aerospace industry, and to an arrangement for producing a reinforced fibre composite component of this type.

BACKGROUND OF THE INVENTION

Although applicable to any fibre composite components, the present invention and the problem on which it is based will be described in detail below with reference to planar carbon-fibre-reinforced plastics material (CFRP) components (also referred to as fibre composite components), for example skin shells of an aircraft.

It is generally known to reinforce CFRP skin shells using CFRP stringers, in order to withstand the high loads in the aircraft region with as low an additional weight as possible. In this case, various stringer types are used, for example T, Ω or I stringers.

In the following, stringers having a hollow profile will be considered, for example stringers having a cap profile, Ω profile and the like. The term hollow profile relates to a stringer profile, the inner faces of which, together with a portion of a fibre composite component to be reinforced, form a cavity or interior. Hereinafter this interior is referred to as a receiving region.

This will be illustrated in FIG. 1 by way of a schematic perspective view of a reinforced fibre composite component. Two reinforcing elements 3 are applied to a fibre composite component portion 2, for example a skin shell or a skin laminate of an aircraft, of the reinforced fibre composite component 1. The reinforcing elements 3 are configured as a hollow profile, in this example as a cap profile or Ω stringer. They each comprise two foot portions 13 which as a base form the connecting face to the skin shell. The foot portions 13 are connected to a cover wall 10 via side walls 11 and 12, which in this case project upwards at an angle, the cover wall 10 extending substantially parallel to the foot portions 13. The inner faces of the cover wall 10, side wall 11 and 12 and the portion of the fibre composite component portion 2 which is located therebelow define the above-mentioned interior, which is referred to as a receiving region 9. In this case, the regions where the reinforcing elements 3 are mounted are each characterised as a moulding portion 8. In this case, after completed mounting on the fibre composite component portion 2, the left-hand reinforcing element 3 is also provided with a pressure element 4 which is inserted into the receiving portion 9.

When producing fibre composite components of this type from fibre composite plastics materials, it is necessary during the curing process to compact the composite of fibres and matrix materials in order to avoid air inclusions and to be able to achieve a particular fibre volumetric content in the cured skin laminate.

Fibrous semi-finished products are to be understood to mean woven fabrics, non-woven fabrics and fibre mats. These are provided with a matrix, for example an epoxy resin, and then cured, for example in an autoclave.

Owing to the mostly planar configuration of the fibre composite components 1, this compaction of the fibrous semi-finished products or fibres during the curing process is generally effected by the use of differential pressure. For this purpose, a vacuum construction is created, which is advantageously produced by a plastics material film which at its edges is hermetically bonded to the mould. The mould and the film thus form a hermetically sealed space in which the fibrous semi-finished product is enclosed. By removing the medium inside this hermetically sealed space by suction, a relative overpressure is achieved outside the vacuum construction, whereby the composite of fibres and matrix can be pressed during the curing process. Alternatively or in addition, the force for compacting the fibre/resin composite can be increased by a pressure increase outside the vacuum construction.

The production of fibre composite components requires a certain pressure during the curing process in order to compact the skin laminate. This pressure can be applied or transferred to the component by various pressure elements. As mentioned above, a pressure element of this type is shown by reference numeral 4 in FIG. 1. In this case, the pressure element 4 is also required in particular to exert pressure on the face of the skin laminate which is covered by the reinforcing element 3, between the foot portions 13 of the reinforcing element 3, in order to compact this portion.

It is often necessary to position and fasten the pressure element in a precise manner relative to the semi-finished product and the curing device. Where applicable, component parts must be received, transported and positioned as a unit together with the pressure elements, for example by means of a gripper. For this purpose a fastening device is required which fastens component parts and pressure elements to one another and which can be released again at the latest at the end of the production process. This relates to all types of fibre composite production methods, in particular prepreg and dry fibre methods, as well as similar production methods in which, for example, one or the two parts of the component may consist of other materials, for example a light metal. Particularly in the case of processes involving cap profiles, the interior or receiving region must be equipped with a pressure element in order to compact the inner walls and in particular the skin laminate of the portion of the fibre composite component which is located below the receiving portion 9 (FIG. 1).

Until now, the pressure elements have either been received, transported and then positioned relative to one another separately from the components to be pressurised, or a common integration of a so-called subelement (fibre composite profile, reinforcing element) and a pressure element takes place in the vacuum construction, although this is only possible in the case of very small components, when the subelement and pressure element can be clamped together at their end faces, for example. For large and very long component parts, this is only possible at considerable additional cost. The separate integration of the pressure elements and subelements of the fibre composite component during the curing process results in positioning inaccuracies and therefore geometrical differences of the subsequent component. The pressure elements are at risk of being displaced during the process. In the worst case, they may be clamped in the component and laminated in.

Until now the pressure elements have therefore been positioned and attached using gravity and friction and/or using one- or two-sided adhesive tapes, using which said elements can be fixed inside and/or in/on the curing device. This method leads to the drawback that these elements can sometimes no longer be released after curing, the pressure elements therefore having to remain in the component after curing, possibly leading to rejection of the component.

The following methods are also known:

1) The first side of the subsequent fibre composite component in the form of the fibrous semi-finished product is laid in the curing device. The pressure element is positioned on said side before the cap element (reinforcing element) is put on. A drawback in this case is that the pressure element can be displaced and/or clamped between the two parts of the component during the curing process.

2) The pressure element is laid in the cap profile and held manually while the cap element is being positioned. However, this is only possible if the dimensions of the component are small. This method is not possible in the case of relatively large components, since many people and coordinated action are required for this purpose. In this case, the pressure element may fall out of the cap element, and there may therefore be a risk of damage. A further risk is that of the pressure element being clamped between the skin laminate (first side of the subsequent fibre composite component) and the second part (reinforcing element).

3) When the component is configured with a large length and a constant internal cross-section, it is possible to draw in the pressure element after placing the cap element on the skin laminate. However, this method can only be used if the lengths of the component do not exceed particular lengths dependent on the material of the pressure element. In this case, however, the cap element must have a constant internal cross-section over the entire length.

4) The pressure element is attached to the skin laminate using adhesive tapes. The pressure element can no longer be removed in the case of relatively large lengths of the cap element, since the bond between the pressure element and the component is reinforced by the pressure differential.

5) Attachment using an adhesive is not possible for all types of pressure element, since these must have a surface which is anti-adhesive with regard to the material of the matrix. Owing to these surfaces, low-viscosity adhesives roll off, preventing the application of adhesive.

6) When hollow components are produced from fibre composite materials comprising pre-impregnated fibres in the co-bonding method, the pressure element can be attached or fastened with positive locking by means of an adhesive film. For this purpose, the pressure element is integrated into the cured component (reinforcing element) and prevented from falling out by a continuous adhesive film. However, this can only be used for a previously cured component and fibre composite components made of pre-impregnated fibres. In addition, the cured component has a higher weight owing to the additional adhesive film.

DE 10 2007 061 431 A1 discloses a method for reinforcing a fibre composite component, in which a reinforcing element is received by a receiving portion of a vacuum mat and applied in a sealing manner to a fibre composite component to be reinforced, to form a moulding portion. The vacuum mat can also receive stringers having a hollow profile, but then pressure elements are also required since the vacuum mat is not adapted for interiors of the stringers.

DE 10 2008 032 834 discloses a method for positioning a tubular mould core in the receiving region of a reinforcing element. Means for positioning the mould core in the receiving region with positive locking and/or frictional engagement are provided at the reinforcing element. The means for positioning the mould core are provided, for example, as clip-shaped undercuts in the transition region between the foot portions and the side walls of the reinforcing element.

EP 2 159 039 discloses a method for producing composite structures, the composite material being placed on a mould body for shaping. For positioning the composite material, magnets are provided in the mould body. Owing to the fact that the composite material comprises fibres made of a magnetic material, the composite material can be placed and fastened accurately on the mould body.

SUMMARY OF THE INVENTION

In a method for reinforcing a fibre composite component for the aviation and aerospace industry, a reinforcing element comprising a receiving region and a pressure element adapted to the geometry of the receiving region are provided. The pressure element is inserted into the receiving region of the reinforcing element. In this case, the reinforcing element and the inserted pressure element are fastened relative to one another in a reproducible manner by means of a reversible fastening device. The reversible fastening device comprises at least a first fastening portion mounted on the pressure element and at least a second fastening portion which can be mounted on the reinforcing element. The reinforcing element, together with the pressure element fastened thereto, is then applied in a reproducible manner to the fibre composite component to be reinforced, to form a moulding portion. The moulding portion formed in this manner is cured to connect the reinforcing element to the fibre composite component. The reversible fastening device and the pressure element are then removed from the reinforced fibre composite component.

An arrangement for producing a reinforced fibre composite component for the aviation and aerospace industry is also provided. The arrangement comprises the following:

a reinforcing element comprising a receiving region;

a pressure element adapted to the geometry of the receiving region for inserting the pressure element into the receiving region;

a reversible fastening device for fastening the reinforcing element and the inserted pressure element relative to one another in a reproducible manner, the reversible fastening device comprising at least a first fastening portion mounted on the pressure element and at least a second fastening portion which can be mounted on the reinforcing element;

a transport device which comprises a support device for receiving the reinforcing element and the pressure element inserted in the receiving region of the reinforcing element, for applying the reinforcing element, together with the pressure element fastened thereto, in a reproducible manner to the fibre composite component to be reinforced, to form a moulding portion;

a curing device for curing the formed moulding portion, to connect the reinforcing element to the fibre composite component; and a removal device for removing the reversible fastening device and the pressure element from the reinforced fibre composite component.

The transport device is provided for transporting at least the reinforcing element comprising the inserted, fastened pressure element into a predetermined position relative to the fibre composite component to be reinforced. The arrangement can also include at least a support device for receiving at least a reinforcing element and a pressure element. The curing device can comprise a base plate which, together with the transport device, can have centring means which correspond to one another for positioning the reinforcing element in a reproducible manner relative to the fibre composite component to be reinforced.

The present invention thus has the advantage over the approaches mentioned at the outset of making it possible to fasten in a reversible manner reinforcing elements and pressure elements made of different materials, in particular in the case of large and long components.

A basic idea of the invention consists in providing a reversible fastening of a reinforcing element, in particular a cap profile or hollow profile, and a pressure element in three-dimensional space relative to one another by means of a reversible fastening device, in particular having magnetic functional elements.

In this case, the reinforcing element and pressure element remain fastened during movement, including rotation and positioning of this entire arrangement inside or on the component parts to be cured or the curing device, and can be released again at the latest at the end of the production process.

The following advantages are provided:
Reliable positioning of reinforcing element and pressure element
Good positioning accuracy
Complex positioning and fastening units are dispensed with
It is possible to fasten the reinforcing element and the pressure element in the case of large and long components, in particular when the pressure elements are configured as a film tube. It is not necessary to fasten the pressure element from the edge.
Large component lengths can be handled, in particular mechanically.
The fastening is reversible.
The fastening allows the combined operation of fastening the pressure element inside the reinforcing element and at the same time fastening the reinforcing element/pressure element system in the curing device and/or rigging device.
The method makes it possible to fasten the pressure element in the reinforcing element during the handling process, without this fastening leading to an increase in the forces during the removal process.
Mechanical clamping is not necessary for fastening the pressure element in the reinforcing element (contact with activated adherend surface is avoided).
No disadvantageous additional weight arises, since all elements can be removed again after the curing process.

The reversible fastening device can be removed, at least in part, before the formed moulding portion is cured. This is advantageous because, when generating a magnetic fastening force, permanent magnets are not negatively influenced in terms of their service life and field strength properties by the curing temperatures, and also because a magnetic element mounted or a fastening portion applied outside the reinforcing element does not interfere with vacuum components to be applied for the curing process.

In an embodiment, the fastening device is formed in such a way that a fastening force is provided by a pair of magnets and/or a combination of a permanent magnet or electromagnet and a magnetisable ferromagnetic element (for example a metal). The reinforcing element and the pressure element are each provided with a magnet (permanent magnet or electromagnet) or an element made of ferromagnetic material. The magnet or ferromagnetic element can, as a first fastening portion, be located either on, inside the wall thickness of the pressure element or completely inside the pressure element. The corresponding counterpart thereto, a second fastening portion, is located either on the opposite side of the reinforcing element and/or in a support device of a positioning and transfer unit, by means of which the reinforcing element and the pressure element are received as a unit.

In an embodiment, the second fastening portion of the reversible fastening device is mounted on the outside of the reinforcing element, the reinforcing element being arranged between the first fastening portion and the second fastening portion of the reversible fastening device in this case.

If one of the fastening portions consists of a magnetic assembly made of ferromagnetic material, this material can be used in various configurations:
as continuous tape
as a plurality of individual small plates (which can be interconnected in various ways, for example by means of adhesive tape, integrally cast in a chain/cable element, etc.)
as a chain comprising ferromagnetic members
as one or more cables.
The following can be used as materials for this purpose:
ferromagnetic iron
ferromagnetic steel
ferromagnetic spring steel (for flexible applications)
the magnet per se (permanent magnet or electromagnet).

The above-mentioned ferromagnetic elements can be attached to the pressure element using adhesive or using adhesive tape. In some applications it is sufficient to bring the respective fastening portion into position and hold it there by means of gravity, in order then to produce the fastening using the corresponding fastening portion and subsequently transport the entire unit and position it on the component to be reinforced.

The magnetic fastening portion can be located in the wall of the pressure element, it being possible to achieve this for example by welding, casting or embedding said portion in the wall material of the pressure element.

Inside the pressure element, the respective fastening portion can for example result from a bond on the inner wall of the pressure element, optionally during the production of the pressure element. In certain cases positioning is also possible by means of gravity or the geometry of the pressure element of the respective fastening portion.

Depending on the production process, the magnet or ferromagnetic material (the fastening portion) can be removed partially or completely after the reinforcing element has been positioned and cured. The use of a combination of a magnet and a ferromagnetic element is recommended. It is advantageous for this process to be carried out using the ferromagnetic element on the pressure element and the magnet on the reinforcing element, since in many such cases the magnet can be removed again before the curing process.

The magnet, as a second fastening portion, can also be integrated in a housing comprising a handle and/or handling supports. This support device formed in this manner can, by way of suitable connection means, also cooperate with a transport device or be a component thereof.

In an alternative embodiment, the reinforcing element and the inserted pressure element are fastened relative to one another in a reproducible manner by means of the fastening device using a reversible adhesive element which is mounted between the pressure element and the reinforcing element. When this reversible adhesive element is removed, the adhesive adhering to the reinforcing element is removed completely or at least mostly. Adhesive and cohesive bonds are possible. The adhesive can also be liquid, film-like (for example double-sided adhesive tape) or solid (thermoplastic hot-melt adhesive). In this case, there is the advantage over the prior art that the adhesive can be removed substantially completely.

The adhesive can also be formed in such a way that it loses its adhesive strength by the effect of particular process parameters during and/or after the curing process, or that its adhesive strength is reduced to such an extent that complete removal is possible. These process parameters may be, for example, particular temperatures, fluids at particular temperatures, particular chemicals in fluid form.

It is also possible for the adhesive to be substantially completely removable by simultaneous application of a tensile force to the pressure element and application of a particular fluid in a defined chemical composition.

In an alternative configuration, the reversible adhesive element is provided as a double-sided adhesive tape comprising an insert layer which can be influenced, for example by repelling magnetic forces from outside the reinforcing element and/or attracting magnetic forces from inside the pressure element, in such a way that release or removal of the adhesive layer is assisted by the active magnetic forces.

Electrostatic forces can also be applied to assist the removal of the reversible adhesive element comprising adhesive from the reinforcing element.

A hot-melt adhesive can be formed in such a way that upon cooling after the curing process it has a low pot temperature at which removal of the pressure element is readily possible.

In yet another alternative, the reinforcing element and the inserted pressure element are fastened relative to one another in a reproducible manner by means of the fastening device using a device for generating and applying electrostatic charging of the fastening portions. For this purpose, the fastening portions are made of an electrostatically chargeable material. In a particularly advantageous embodiment, the reinforcing element and the pressure element themselves form the electrostatically chargeable fastening portions. Charging can take place for example via the support device once positioning of the reinforcing element and pressure element is complete. The electrostatic forces then form the fastening force which holds the reinforcing element and pressure element together.

The support device can comprise the second fastening portion in the form of an electromagnet.

Alternatively, the support device can also have electrical connections for applying electrostatic charging of the fastening portions, in such a way that charging can take place in an automatic, mechanically controlled manner, the safety of operating personnel being easy to maintain.

BRIEF DESCRIPTION OF THE DRAWINGS

The invention is described in detail below by way of embodiments with reference to the accompanying figures of the drawings, in which.

In the figures, like reference numerals denote like or functionally like parts, unless indicated otherwise.

DETAILED DESCRIPTION OF THE INVENTION

Figure 1:
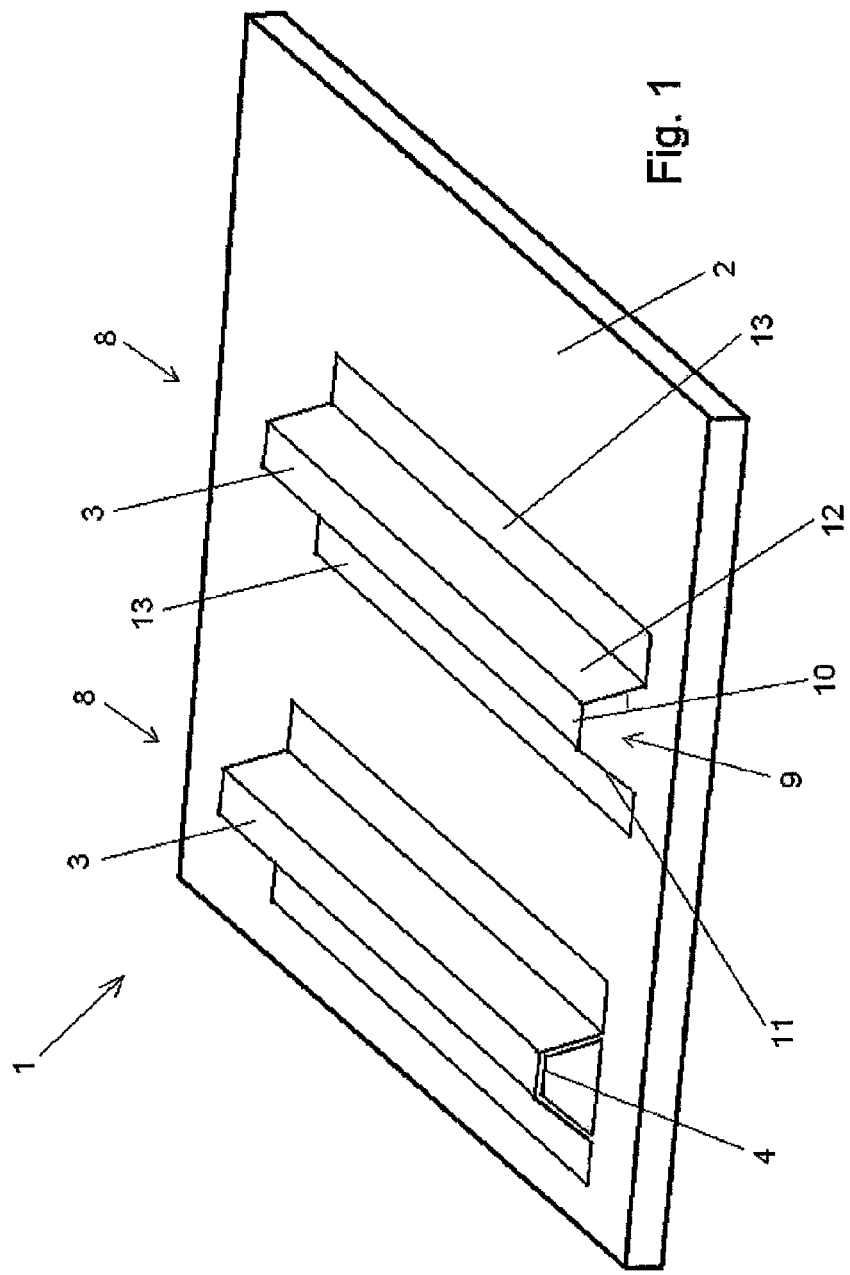
FIG. 1 is a schematic perspective view of a reinforced fibre composite component.

FIG. 1 has already been described above.

To produce the example shown in FIG. 1 of an integral fibre composite component 1 of an outer skin made of composite materials of an aircraft (not shown), which fibre composite component is reinforced with reinforcing elements 3, which in this case comprise cap profiles, the reinforcing elements 3 made of cured fibre composite materials are adhesively bonded to a skin laminate (the fibre composite component portion 2 in FIG. 1) made of uncured fibres pre-impregnated with resin (prepreg).

Figure 2:
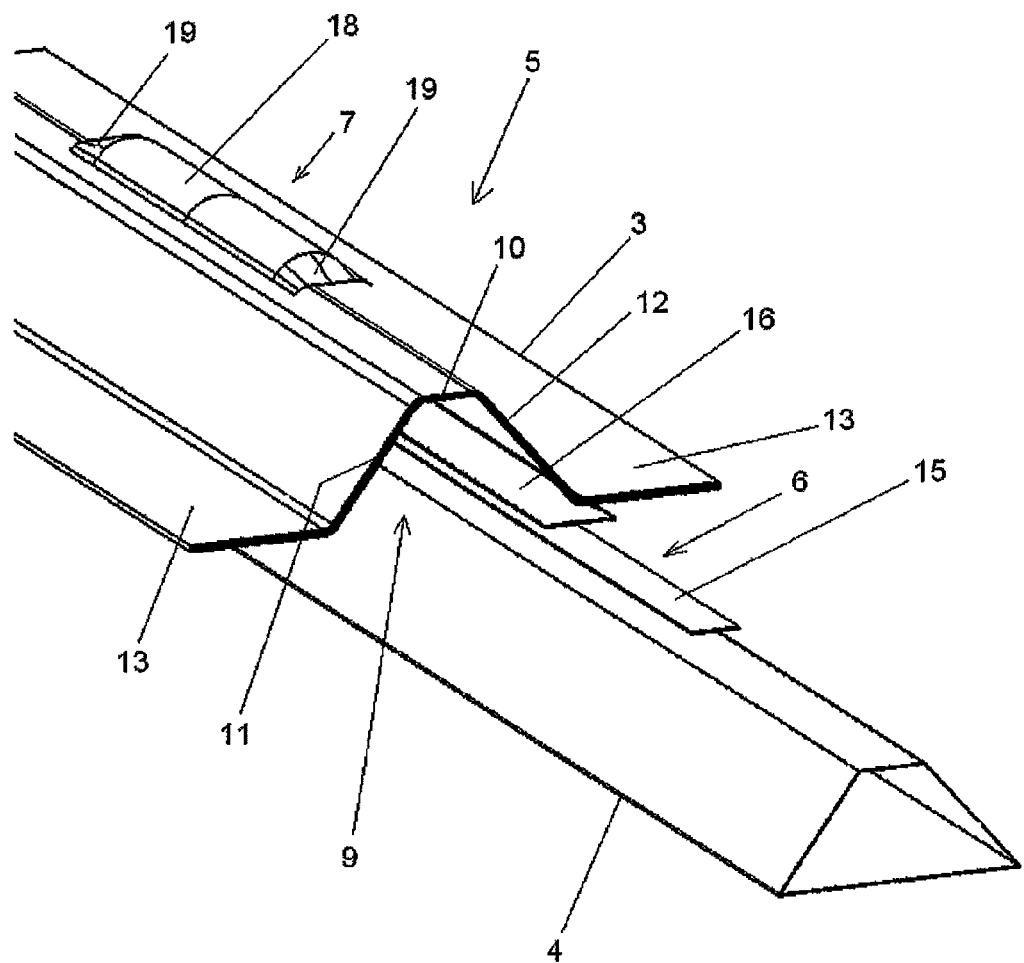
FIG. 2 is a schematic perspective exploded view of a reinforcing element comprising a first embodiment of a fastening device.

The reinforcing elements 3 are firstly provided with pressure elements 4. For this purpose, a schematic perspective exploded view of a reinforcing element 3 comprising a first embodiment of a fastening device 5 is shown in FIG. 2.

A reinforcing element 3 for reinforcing a fibre composite component 1 (see FIG. 1) is configured as a hollow profile. In this case, the reinforcing element 3 comprises a receiving region 9 which is located between the foot portions 13 and limited by side walls 11 and 12 and a cover wall 10. In this case, the receiving region 9 has a trapezium-shaped cross-section.

In this example, a pressure element 4 is formed of a tube having a trapezium-shaped cross-section which is adapted to the inner contour, that is to say the receiving region 9, of the reinforcing element 3.

The pressure element 4 and the reinforcing element 3 are fastened relative to one another via a reversible fastening device 5. This reversible fastening device 5 comprises a first fastening portion 6 on the pressure element 4 and a second fastening portion 7 on the reinforcing element 3.

In this first embodiment of the fastening device 5, the first fastening portion 6 of the fastening device 5 is a ferromagnetic element 15. It is attached to the face of the pressure element 4 which corresponds to the inner face of the cover wall 10 of the reinforcing element 3. The ferromagnetic element 15, which may for example be a continuous tape, is attached using a suitable adhesive and/or adhesive strips. A covering element 16 in the form of a covering film which facilitates removal of the pressure element 4 after the curing process and at the same time also protects the ferromagnetic element 15 from external influences, for example materials of the reinforcing element 3, is mounted over the ferromagnetic element 15. The covering element 16 may for example be an anti-adhesive film, for example a fluoropolymer (PTFE, FEP, ETFE), whereby for example adhesive bonding owing to contamination with the matrix (epoxy resin) of the skin laminate (see FIG. 1) is avoided.

In this example, the second fastening portion 7 of the fastening device 5 is a magnetic element 18, for example a permanent magnet, which is arranged on the cover wall 10 of the reinforcing element 3. In this case, the magnetic element 18 comprises inclines 19 in order to facilitate cooperation with a handling device (described in detail below). Depending on the length of the reinforcing element 3, the magnetic element 18 can be adapted or consist of a plurality of individual magnetic elements 18 arranged in succession in the longitudinal direction of the reinforcing element 3. These individual magnetic elements 18 may for example be arranged in a suitable strip or an enclosure.

The pressure element 4 provided with the first fastening portion 6 is then inserted into the receiving region 9 of the reinforcing element 3 and positioned relative to the reinforcing element 3, the desired position of the reinforcing element 3 and pressure element 4 being fixed by the cooperation of the first fastening portion 6 and the second fastening portion 7 in such a way that the first fastening portion 6, as a magnetisable ferromagnetic element 15, is attracted by the second fastening portion 7, as a magnetic element 18 or permanent magnet. In this case, the pressure element 4 connected to the first fastening portion 6 is also attracted in the receiving region 9 of the reinforcing element 3 and held therein.

Figure 3A:
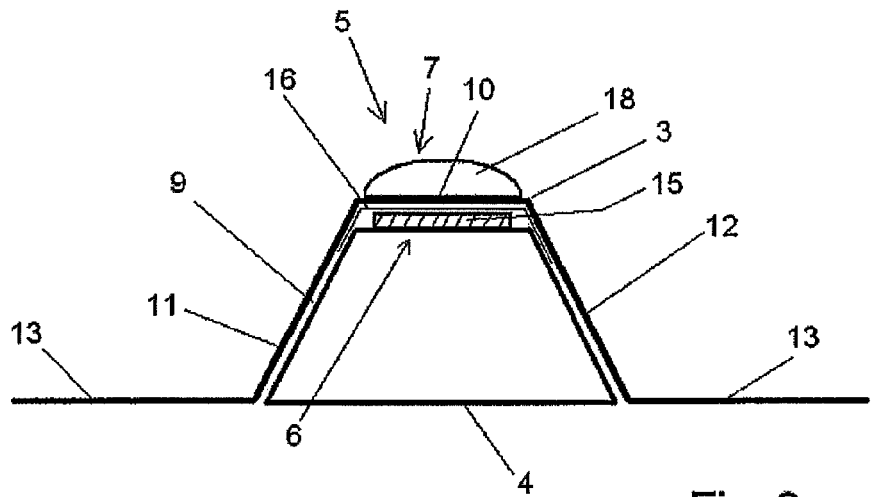
FIG. 3a-b are schematic cross-sectional views of the reinforcing element according to FIG. 2 comprising variations of the fastening device.
Figure 3B:
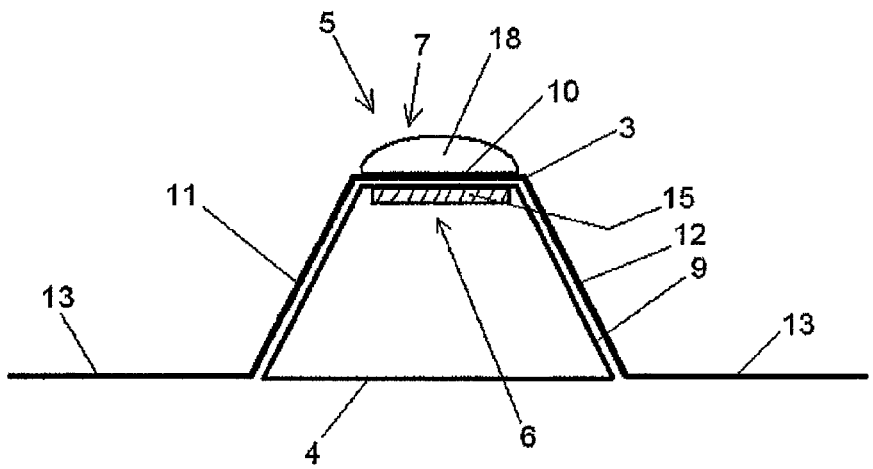

FIGS. 3a and 3b are schematic cross-sectional views of the reinforcing element 3 according to FIG. 2 comprising variations of the fastening device 5. In each case, the pressure element 4 is inserted in the receiving region 9 of the reinforcing element 3 and held fastened by the fastening device 5.

In FIG. 3a, the first fastening portion 6, namely the ferromagnetic element 15, is mounted on the upper outer face of the side of the pressure element 4 which corresponds to the inner face of the cover wall 10 of the reinforcing element 3. In this variation, the covering element 16 is arranged over the ferromagnetic element 15, resting against the side faces of the pressure element 4. In this case, the covering element 16 is configured as a carrier film, as described in the case of FIG. 2, the side thereof facing the pressure element 4 being coated with an adhesive which forms bonds with the ferromagnetic element 15 on the one hand and with the pressure element 4 on the other hand and thus interconnects the ferromagnetic element 15 and pressure element 4.

A further variation of the fastening device 5 is shown in FIG. 3b. In this case, the first fastening portion 6, namely the ferromagnetic element 15, is located inside the pressure element 4. The pressure element 4 may for example be the above-described tube. In this case, the first fastening portion 6 is mounted inside the pressure element 4, for example by bonding the first fastening portion 6 to the inner face of the side of the pressure element 4 which corresponds to the inner face of the cover wall 10 of the reinforcing element 3 and in this case contacts said face directly with positive locking. Since in this example the first fastening portion 6 is located inside the pressure element 4, it is covered by the pressure element itself and protected from external influences. In this example shown in FIG. 3b, the following procedure can for example be adopted.

The reinforcing element 3 is arranged in such a way that the receiving region 9 is upwardly open. The pressure element 4 can then be inserted therein. The first fastening portion 6 is then inserted into the interior of the pressure element 4, the first fastening portion 6 being arranged by means of gravity on the inner face of the side of the pressure element 4 which corresponds to the inner face of the cover wall 10 of the reinforcing element 3. The first fastening portion 6 is fastened by the subsequently mounted second fastening portion 7 as described above and the pressure element 4 is held in the previously arranged desired position relative to the reinforcing element 3. The first fastening portion 6 is thus connected to the pressure element 4 with non-positive locking via the fastening device 5, it being possible to dispense with a bonded joint, for example.

FIGS. 3a and 3b show clearly for these examples (also according to FIG. 2) that the first fastening portion 6 is mounted on the pressure element 4 and the second fastening portion 7 is mounted on the reinforcing element 3, the reinforcing element 3 being arranged between the first fastening portion 6 and the second fastening portion 7. In this case, the second fastening portion 7 is arranged on the side of the reinforcing element 3 opposite the pressure element 4. The fastening device 5 thus fastens the pressure element 4 and the reinforcing element 3 with non-positive locking in that the pressure element 4 and the reinforcing element 3 are pulled towards one another.

Figure 4:
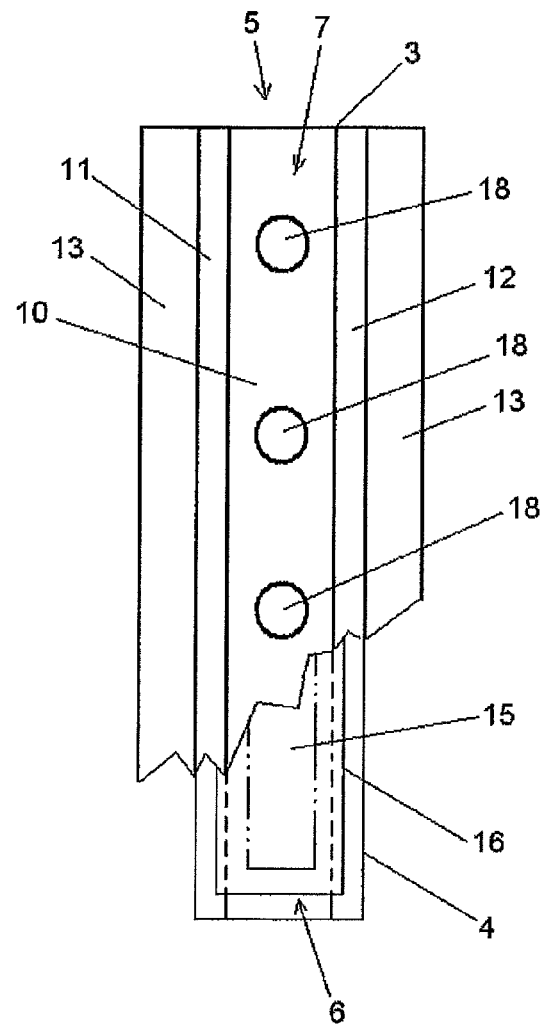
FIG. 4 is a schematic plan view of the reinforcing element according to FIG. 2 comprising a further variation of the fastening device.

FIG. 4 shows a schematic plan view of the reinforcing element 3 according to FIG. 2 comprising a further variation of the fastening device 5. In this case, the second fastening portion 7 is formed using a plurality of magnetic elements 18 (in this case in the form of small, circular magnetic plates) which can for example be interlinked in the longitudinal direction of the reinforcing element 3.

FIG. 4 also shows the covering element 16, which in this case, as in FIG. 3a, covers the ferromagnetic element 15 and is attached as an adhesive film to the pressure element 4.

The fastening device 5 is formed so as to be reversible. For the embodiments shown thus far, this means that in this case the second fastening portion 7 can be mounted on the reinforcing element 3 in a reversible manner, even in relatively large numbers. For example, it can be connected to a suitable handle and can thus be mounted and removed, as described in further detail below in connection with FIG. 6.

Figure 5:
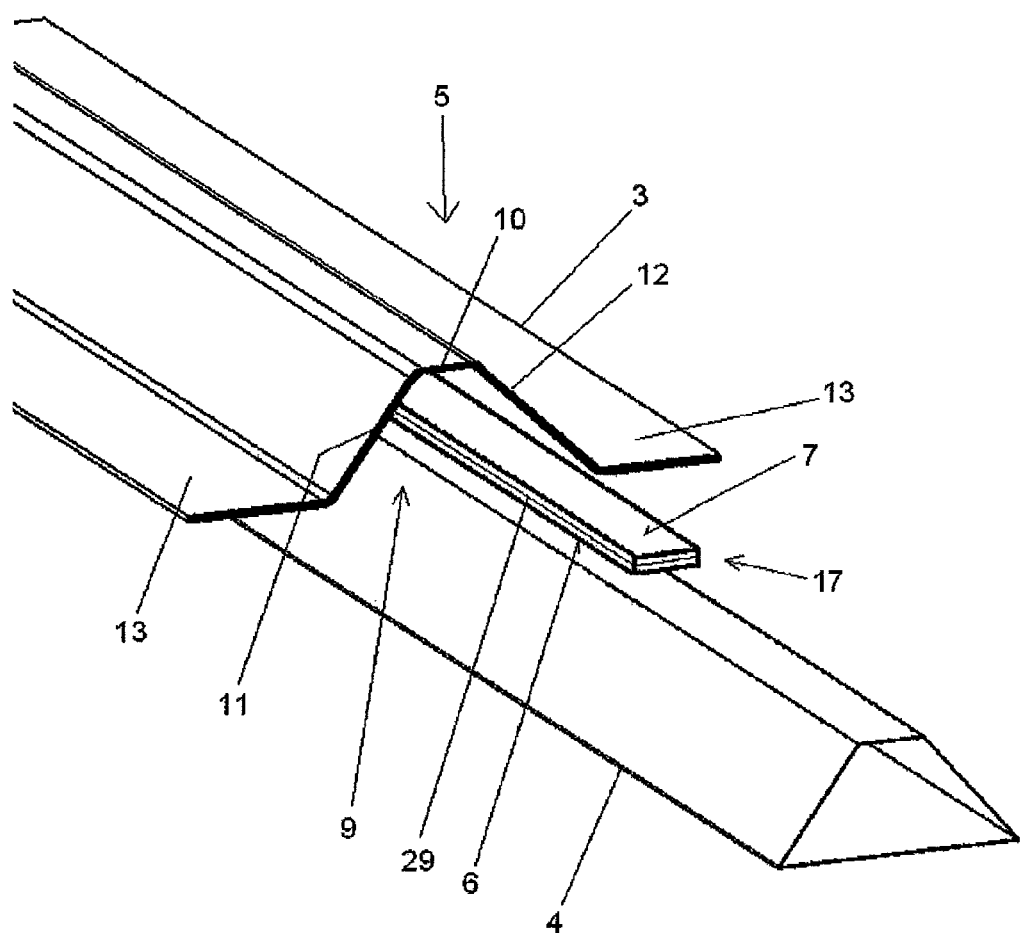
FIG. 5 is a schematic perspective exploded view of the reinforcing element according to FIG. 2 comprising a second embodiment of a fastening device.

FIG. 5 shows a second embodiment of a reversible fastening device 5 in a schematic perspective exploded view of the reinforcing element 3 according to FIG. 2. In this case, the pressure element 4 and the reinforcing element 3 are connected via a fastening device 5 comprising a reversible adhesive element 17. In this case, the first fastening portion 6 can be mounted on the pressure element 4 by adhesive bonding and the second fastening portion 7 can also be mounted by adhesive bonding on the reinforcing element 3, in this case on the inner face of the cover wall 10. The adhesive layer of the second fastening portion 7 is formed in such a way that it can be separated particularly easily after the fibre composite component 1 has been cured. This can also be done by applying particular process parameters, for example different thermal effects, fluids, chemical substances and the like.

In the example shown in this case, the reversible adhesive element 17 comprises an insert layer 29 which is integrated therein and made of a material which can be influenced by external forces, for example magnetic forces and/or electrostatic forces, to assist the removal of the adhesive tape 17 by repulsion and/or attraction. For example, an electromagnet inserted from inside the pressure element 4 can pull the insert layer 29 away from the reinforcing element 3. The application of electrostatic charges of like or different polarities (or the application of a corresponding electrode) to the reinforcing element 3 and insert layer 29 are mentioned by way of example.

It is also conceivable for the reversible adhesive element 17 to be an adhesive and/or cohesive compound, said compound being liquid or film-like (for example adhesive tape). The reversible adhesive element 17 can also comprise a thermoplastic hot-melt adhesive, said adhesive remaining soft after the completed curing operation upon cooling to a particular "pot temperature", and thus allowing easy removal of the pressure element 4.

Figure 6:
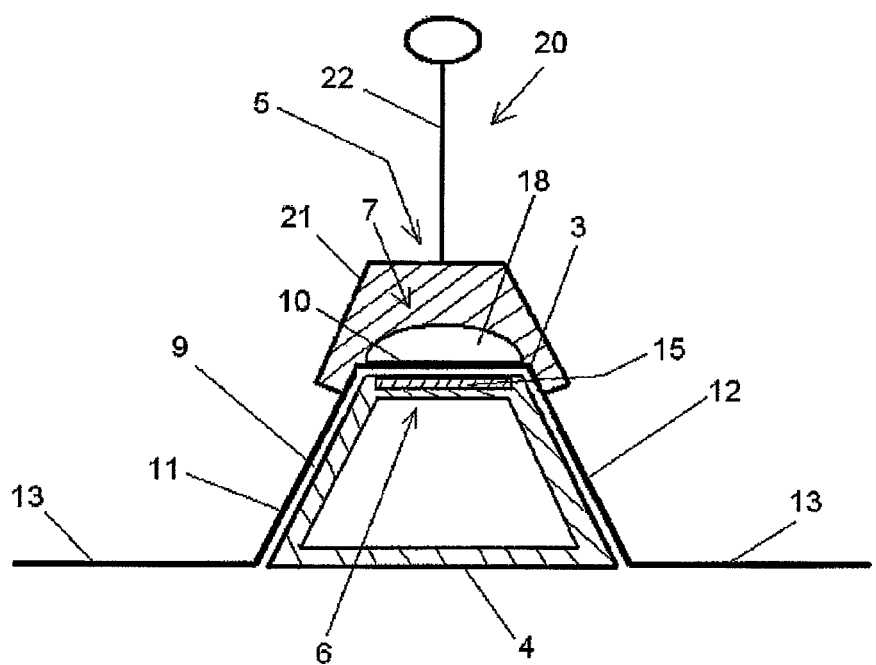
FIG. 6 is a schematic cross-sectional view of the reinforcing element according to FIG. 2 comprising a further variation of the fastening device and a support device.

FIG. 6 is a schematic cross-sectional view of the reinforcing element 3 according to FIG. 2 comprising a further variation of the fastening device 5 and a support device 20.

In this example, the pressure element 4 is formed in such a way that the first fastening portion 6 is inserted, for example introduced and adhesively bonded, injection-moulded, welded or the like, inside the wall of the pressure element 4. The second fastening portion 7 is arranged as a magnetic element 18 in a support body 21 of a support device 20, which in this case is connected to a support element 22. The support element 22 may for example be a cable loop or a rod comprising a handle for manual handling. If the pressure element 4 is inserted in the receiving region 9 of the reinforcing element 3 and positioned relative to the reinforcing element 3, the second fastening portion 7 can be mounted, in this example externally, on the reinforcing element 3 using the support device 20. The reinforcing element 3 can then be transported together with the pressure element 4 which is fastened and held relative to the reinforcing element 3 via the fastening device 5.

The support device 20 can comprise a plurality of support devices 20 distributed over the length of the reinforcing element 3. A support body 21 having the same length as the reinforcing element 3 is also possible. For this purpose, the associated support device 20 can be formed for one or more reinforcing elements 3 and provided for mechanical transportation.

Figure 7:
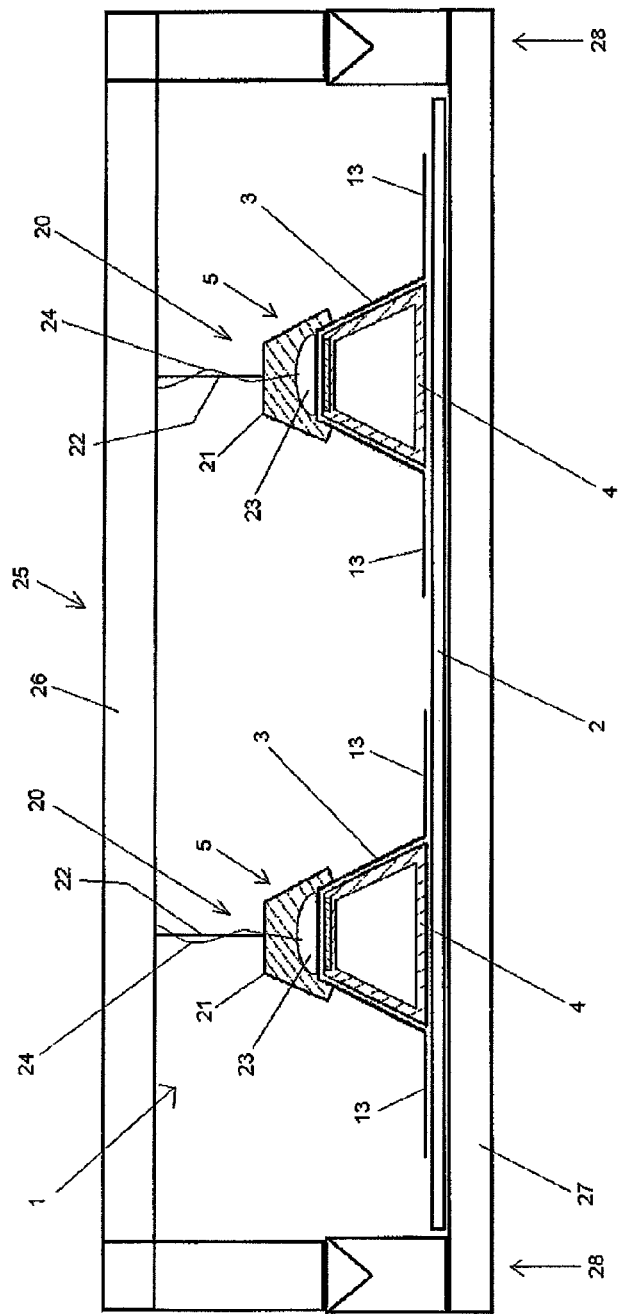
FIG. 7 is a schematic cross-sectional view of an exemplary arrangement according to the invention for producing a reinforced fibre composite component.

FIG. 7 is a schematic cross-sectional view of an example of an arrangement 25 according to the invention for producing a reinforced fibre composite component 1.

The skin laminate in the form of the fibre composite component portion 2 (see FIG. 1) made of pre-impregnated fibres is mounted on a base plate 27. In this case, two reinforcing elements 3, each comprising pressure elements 4 held by a reversible fastening device 5, are for example each held on a transport device 25 via a support device 20, as described with reference to FIG. 6, positioned on the fibre composite component portion 2 and applied. The undersides of the foot portions 13 were prepared beforehand by applying epoxy adhesive film.

With their side walls 11 and 12, the cover wall 10 and the portion of the skin laminate covered thereby, the reinforcing elements 3 applied to and positioned on the fibre composite component portion 2 form an interior in which the pressure element 4 is arranged. In this state, the pressure element 4 is surrounded by the inner faces of the walls 10, 11 and 12 of the reinforcing element 3 and by the face of the fibre composite component portion 2 which is located therebelow.

In the support bodies 21, the two fastening portions 7 are formed as electromagnets 23 and can each be loaded via a line 24 with electrical energy for magnetisation.

The arrangement 25 may for example be constructed in a modular manner, in such a way that it can easily be adapted to fibre composite components 1 of different dimensions.

The support devices 20 engage the reinforcing elements 3 provided with the pressure elements 4, in that the support bodies 21 are mounted on the outsides of the cover walls 10 of the reinforcing elements 3. The electromagnets 23 are then supplied with current and, together with the first fastening portions 6 of the pressure elements 4, form reversible fastening devices. The reinforcing elements 3 and pressure element 4 fastened relative to one another in this way are transported onto the base plate 27 shown here in FIG. 7, positioned thereon and applied thereto. This can be done in different ways depending on the situation, for example by means of a crane device or using a rail system.

In this case, for reproducible positioning, the base plate 27 and transport device 26 at the edge of this component device have centring means 28, for example centring pins on the transport device 26 and corresponding recesses in the base plate 27.

If the reinforcing elements 3 comprising the pressure elements 4 are centred, positioned and deposited on the base plate 27 by the transport device 26, the current supplied to the electromagnets 23 is interrupted, it being possible for the second fastening portions 7 in the form of the electromagnets 23 to be removed by the transport device 26. However, the positioning carried out beforehand between the pressure elements 4 and reinforcing elements 3 remains.

The fibre composite component 1, together with the reinforcing elements 3 and pressure elements 4 arranged therein, which are loaded with corresponding pressure, can now be prepared for curing and cured in a known manner. The pressure elements 4 are then withdrawn from the reinforcing elements 3 after removal of the pressurisation.

The arrangement 25 can comprise a control device which is connected to the centring means 28, drive means for moving the transport device 26, drive means for support devices 20, current supply means for the electromagnets 23 and further signalling and sensor devices. As a result, the production of the reinforced fibre composite component 1 is automated in such a way that a high level of reproducibility is achieved with the lowest likelihood of errors, the pressure elements 4 and the support devices 20, and thus also the reversible fastening devices 5, being reusable.

Although the present invention has been described herein by way of preferred embodiments, it is not limited thereto but can be modified in a variety of ways.

For example, not only Ω stringers but also reinforcing elements having other hollow profile cross-sections, for example triangular, square or polygonal, can be treated and processed using the invention.

The fastening device 5 can also comprise first and second fastening portions 6, 7 on the other side faces of the pressure element 4 and the corresponding faces of the reinforcing element 3.

It is also conceivable for the fastening device 5 to comprise a device for applying static electricity to corresponding electrostatically chargeable fastening portions 6, 7. In this case, the pressure element 4 and reinforcing element 3 themselves form the fastening portions 6, 7. This is possible for example when fastening portions 6, 7 or a pressure element 4 and reinforcing element 3 consist of plastics material or other electrostatically chargeable materials.

It is also possible for the first fastening portion 6 in the pressure element 4 to be an electromagnet.

The reinforcing element 3 can also be partially cured.

A method for reinforcing a fibre composite component 1 for the aviation and aerospace industry comprises the following method steps:

A reinforcing element 3 comprising a receiving region 9 and a pressure element 4 adapted to the geometry of the receiving region 9 are provided. The pressure element 4 is inserted into the receiving region 9 of the reinforcing element 3. In this case, the reinforcing element 3 and the inserted pressure element 4 are fastened relative to one another in a reproducible manner by means of a reversible fastening device 5. The reversible fastening device 5 comprises at least a first fastening portion 6 mounted on the pressure element 4 and at least a second fastening portion 7 mounted on the reinforcing element 3. The reinforcing element 3, together with the pressure element 4 fastened thereto, is then applied in a reproducible manner to the fibre composite component 1 to be reinforced, to form a moulding portion 8. The moulding portion 8 formed in this manner is cured to connect the reinforcing element 3 to the fibre composite component 1. The reversible fastening device 5 and the pressure element 4 are then removed from the reinforced fibre composite component 1.

In an exemplary embodiment of the method, the first fastening portion 6 is formed by the pressure element 4 and the second fastening portion 7 is formed by the reinforcing element 3.

In an exemplary embodiment of the arrangement 25, the reversible fastening device 5 is formed for electrostatic charging of the fastening portions 6, 7, the fastening portions 6, 7 being formed as separate components or by the reinforcing element 3 and the pressure element 4 respectively.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. An arrangement for producing a reinforced fibre composite component for the aviation and aerospace industry, comprising:
   a skin laminate in the form of the fibre composite component portion
   a reinforcing element comprising a receiving region, a cover wall, side walls and a foot portion;
   a pressure element adapted to the geometry of the receiving region for inserting the pressure element into the receiving region;
   a reversible fastening device for fastening the reinforcing element and the inserted pressure element relative to one another in a reproducible manner, the reversible fastening device comprising at least a first fastening portion mounted on the pressure element and at least a second fastening portion, wherein the first fastening portion is a ferromagnetic element;
   a transport device which comprises a support device for receiving the reinforcing element and the pressure element inserted in the receiving region of the reinforcing element, for applying the reinforcing element, together with the pressure element fastened thereto, in a reproducible manner to the fibre composite component to be reinforced, to form a moulding portion, wherein the support device comprises a support body and engages the reinforcing element provided with the pressure element, in that the support body is mounted on the cover wall of the reinforcing element, wherein the support device comprises the second fastening portion and wherein the second fastening portion is formed as a magnet arranged in a cavity of the support body and positioned adjacent to the cover wall of the reinforcing element when transporting the reinforcing element together with the pressure element;
   a curing device configured to cure the formed moulding portion, to connect the reinforcing element to the fibre composite component; and
   a removal device configured to remove the reversible fastening device and the pressure element from the reinforced fibre composite component.

* * * * *